Patented Oct. 10, 1944

2,360,186

UNITED STATES PATENT OFFICE 2,360,186

PROCESS FOR THE RECOVERY OF PENTAERYTHRITOLS

Joseph A. Wyler, Allentown, Pa., assignor to Trojan Powder Company, Allentown, Pa.

No Drawing. Application June 10, 1943, Serial No. 490,337

7 Claims. (Cl. 260—637)

This invention relates to a process for the recovery of pentaerythritols from mixtures and solutions of the same which are usually encountered in the commercial preparation of pentaerythritol and dipentaerythritol.

An object of the present invention is to recover pentaerythritols from mixtures containing the usual syrupy products resulting during the formation of these pentaerythritols from formaldehyde and acetaldehyde. Another object is to provide a process for this recovery in which the minimum number of steps are required. A further object is to increase the yields of pentaerythritols recovered. A still further object is to isolate the syrupy products in a purer and more stable form. Other and further objects will become apparent upon a perusal of this specification.

Present commercial processes for the preparation of pentaerythritols are based upon the condensation of one molecule of acetaldehyde with about four molecules of formaldehyde in aqueous alkaline media at temperatures of about 20° to 50° C. and in such a volume of water as to provide a solution containing less than 20% of aldehydes at the beginning of the condensation. The following equation is representative of the main reaction:

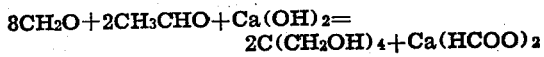

$$8CH_2O + 2CH_3CHO + Ca(OH)_2 = 2C(CH_2OH)_4 + Ca(HCOO)_2$$

This reaction, however, does not convey a complete picture of the chemical changes involved and it is now known that several chemical reactions take place simultaneously and consecutively to form by-products as dipentaerythritol, molecular complexes of pentaerythritol and dipentaerythritol, polyhydroxy syrupy products, etc.

Also, the reaction given above is for the use of lime as condensing agent although other agents as NaOH, KOH, etc., may be used. Consequently, depending upon the particular alkali used for the condensation, various techniques are used in industry for the isolation of the pentaerythritols in pure condition, but in all of these cases the separation of the pentaerythritols from a syrupy product is necessary and this separation constitutes a difficult operation.

In all known processes based on the use of water as a crystallization medium there is formed a final mother liquor which still contains too high an amount of the pentaerythritols on the basis of the known solubilities of the pentaerythritols in water. Also, processes using methyl alcohol, ethyl alcohol and propyl alcohol are subject to the same objections mentioned above.

I have discovered that the solubility of pentaerythritol and dipentaerythritol in the syrupy by-products produced in the commercial processes used for the condensation of formaldehyde and acetaldehyde to pentaerythritols is greatly and surprisingly altered by dehydrating the syrupy products.

In order more clearly to show the nature of my invention it is pointed out that pentaerythritol is soluble in cold water to the extent of about 6% by weight and in boiling water to about 45% by weight; that dipentaerythritol is soluble in cold water to the extent of about 0.6% by weight and in boiling water to about 12%, by weight; that the syrupy by-product itself is miscible with water in all proportions; that the simultaneous solubility of pentaerythritol and dipentaerythritol in water (hot or cold) is not at all what would be expected, from their individual solubilities; that the simultaneous solubility of pentaerythritol, dipentaerythritol and the syrupy product in water is even more complex in nature than is the solubility of pentaerythritol and dipentaerythritol in water and what is most significant is the fact that a small amount of water in the syrupy product has a profound effect upon the solvent properties of this syrup in contact with pentaerythritol and dipentaerythritol. Also, pentaerythritol and dipentaerythritol are substantially insoluble in cold, anhydrous butyl alcohols and only slightly more soluble in the hot; but the syrupy product is miscible in all proportions with anhydrous butyl alcohols.

I have discovered that if a mixture comprising pentaerythritols, water and syrupy product, or a mixture consisting of pentaerythritols, water, a metal formate and syrupy product, or a mixture consisting of pentaerythritols, water, formic acid and syrupy product is dehydrated in an alcoholic medium such as normal butyl alcohol that an excellent separation of the pentaerythritols from the syrup is effected and that the syrup is also recovered in a high degree of purity.

The following examples, in which all parts are by weight are given to illustrate my invention.

Example #1

1066 parts of water are placed in a suitable reaction kettle provided with a stirrer, 396 parts of 30% formaldehyde solution added, then a small fraction of 53 parts of Ca(OH)$_2$ in the form of a slurry with 160 parts of water is added followed by the slow addition of 45 parts of 99% acetaldehyde, the mixture being stirred continuously.

The lime is added over a period of about 3 hours and the acetaldehyde over about 2½ hours. The temperature is maintained at about 30° C.

The whole mixture is stirred until an iodine titration indicates the presence of only about 0.10% CH$_2$O in the mixture, when it is filtered to separate the insoluble impurities as Ca(OH)$_2$, CaCO$_3$, Al$_2$(OH)$_3$, Mg(OH)$_2$ etc., and to furnish a clear solution containing pentaerythritol, dipentaerythritol, calcium formate, syrupy polyhydroxy-materials, etc.

The details of the process described above are not part of the present invention but are given to show how the raw material used in my process may be prepared.

Example #2

The clear filtrate obtained in Example #1 is usually slightly alkaline due to the presence of a small amount of lime in solution as a basic formate. This alkalinity is removed by the addition of an acid such as HCOOH. The slightly acid liquor is evaporated to a boiling point of about 106° C. when it is discharged into a suitable still provided with a stirrer and a gravity separator for the distillate, then treated with about an equal weight of butanol and the mixture distilled, with stirring.

The first effect of the butanol is to lower the temperature of the mixture, causing the boiling to take place at about 93° C. at ordinary pressure. This removes the water which distills over as an azeotropic mixture with butyl alcohol. As the distillation proceeds more butanol or butanol-water mixture (containing more butanol than corresponds to the azeotropic mixture) is continuously admitted into the still.

The vapor phase obtained thru the boiling, is an azeotropic mixture of butyl alcohol and water which upon cooling and passage thru the separator forms two layers. The lower layer is a water solution of butanol containing about 8% butanol; the upper layer is a butyl alcohol solution of water containing about 20% $H_2O$.

The upper layer is returned to the contents of the still and again forms an azeotropic mixture which in turn, upon cooling, forms the two layers mentioned above. The returning of the butyl alcohol layer is continued until the temperature in the still begins to rise above about 95° C. and there is enough butyl alcohol in the still to form a rather thin mixture. When this return flow has been stopped, the temperature in the vapor in the still will rise rather rapidly to about 112° C. and more quickly to 117° C. The heating of the still is then discontinued and its contents cooled with stirring. The mixture in the still, after cooling, is run into a pressure filter to collect the pentaerythritols and the calcium formate. The filtrate contains the syrupy product and is placed in a suitable still to drive off the butyl alcohol, which is used over again, and to recover the syrupy product which has usefulness as a raw material for lacquers, detergents and explosives.

The mixture of pentaerythritols and calcium formate on the filter is washed with butyl alcohol followed by water and is then ready to be separated into pure pentaerythritols and calcium formate by any of the well known processes.

The washings are run into the original still used to dehydrate the mixture of pentaerythritols, calcium formate and polyhydroxy syrups and treated with the next batch.

The lower layer formed in the separator mentioned above consists of about an 8% solution, by weight, of butanol in water. It is readily fractionally distilled to obtain a butyl alcohol of at least 80% strength, which in turn may be used in the original still for dehydration purposes.

Example #3

A solution containing pentaerythritols, calcium formate, syrupy polyhydroxy materials, etc., obtained as described in Example #1 was treated with a small amount of acetic acid to produce a slight acidity in the mixture and the latter evaporated in an open evaporator until a test on the liquor showed that the pentaerythritol contained therein would begin to crystallize out if the liquor were cooled to about 93° C.

The hot liquor thus obtained was filtered at a temperature of about 95-97° C., the calcium formate on the filter washed twice with boiling water and the filtrate cooled to about 15° C., with a stirring, to effect the crystallization of pentaerythritol and dipentaerythritol from the solution. The yield of pentaerythritols obtained by filtration and washing was 72% of theory, based upon the acetaldehyde started with and the pentaerythritols were found to be free from calcium ion, using the ammonium oxalate method for testing.

The filtrate from the pentaerythritols containing pentaerythritol, dipentaerythritol, syrupy polyhydroxy materials, calcium formate etc. was charged into a suitable still provided with a stirrer and a separator for the distillate, where it was subjected to the butyl alcohol-dehydration-distillation as described under Example #2.

The mixture of crystals consisting of pentaerythritol, dipentaerythritol, and calcium formate thus obtained may then be separated into pentaerythritols and calcium formate by any of the well known processes. The butyl alcohol solution of the syrupy product is distilled to recover the butyl alcohol and the syrup, each in relatively pure condition.

Example #4

A solution containing pentaerythritols, calcium formate, syrupy polyhydroxy materials etc. obtained as described in Example #1 was treated with the theoretical amount of oxalic acid to precipitate all the calcium from the solution. The calcium oxalate thus formed was filtered off, washed with water and the filtrate evaporated and treated with butyl alcohol in the same manner as described under Example #2.

In the present example a small amount of butyl alcohol is converted to butyl formate which accumulates in the butyl alcohol layer and is eventually separated and recovered by fractional distillation in accordance with any of the well known processes.

The pentaerythritols obtained in accordance with the present example are usually free from calcium formate and of such a degree of purity that they are directly useful for lacquers. They are obtained in a total yield of over 80% of theory, based upon the acetaldehyde used.

Although in the examples only the use of a pentaerythritol-containing liquor prepared by the process described in Example #1 is disclosed, I wish to point out that I may use any pentaerythritol-containing mixture resulting from the alkaline condensation of $CH_2O$ and acetaldehyde and containing the syrupy by-products of this condensation.

Also, in place of normal butyl alcohol or butanol I may use any liquid butyl alcohol as isobutyl alcohol or secondary butyl alcohol, although I prefer to use n-butyl alcohol due to its particular solubility in water.

It is of course understood that I may vary my operating conditions in many ways without departing from the spirit of my invention. I may, for instance, vary the proportion of butyl alcohol to impure pentaerythritol product over a wide range; I may introduce the butyl alcohol continuously or intermittently; I may discontinue the dehydration distillation operation at any temperature at which the butyl alcohol solution remaining in the still is substantially anhydrous; or I may filter the anhydrous butyl alcohol mixture while hot although this is not as desirable as filtration in the cold.

I wish to emphasize that it is essential to the success of my process to carry out the dehydration-distillation step described above until the butyl alcohol remaining in the still is substantially anhydrous otherwise too much pentaerythritol and dipentaerythritol would remain in solution in the butyl alcohol and impair the usefulness of the process.

Also, I wish to point out that methyl alcohol, ethyl alcohol and propyl alcohol are not operative in my process and that amyl alcohol, particularly, does not function in the same manner as the butyl alcohols. Amyl alcohol does not have a satisfactory selective solvent ability in regard to the syrupy product and the pentaerythritols.

It is also important to note that the evaporation of these impure aqueous solutions of pentaerythritols is not simply the elimination of a solvent, for the reason that concentrating these aqueous solutions causes the formation and decomposition of molecular complexes between the pentaerythritols themselves and between the pentaerythritols and the syrupy products. The use of a butyl alcohol for the latter part of the evaporation performs the additional function of altering the equilibrium between the molecular complexes of the syrupy products and pentaerythritols in a manner which is favorable to the operativeness of my process, that is, the anhydrous butyl alcohol accomplishes a more perfect separation of pentaerythritols from the syrupy by-product.

It should be noted that when the butyl alcohols are used in accordance with my process that the pentaerythritol and dipentaerythritol are not physically separated from each other but only from the syrupy product. Any of the well-known processes may be used for obtaining the pentaerythritol and the dipentaerythritol in the desired degree of purity from the mixture produced by my present process.

I claim:

1. The process for the recovery of pentaerythritols from aqueous mixtures comprising pentaerythritols and the syrupy products formed during the condensation of formaldehyde and acetaldehyde in aqueous alkaline medium which comprises removing the last portion of the water contained in these mixtures by distillation from mixtures with a liquid butyl alcohol, said liquid butyl alcohol being used in at least sufficient quantity to dissolve the syrupy products and to form a filtrable mixture at the end of the distillation, cooling, filtering, washing the pentaerythritol crystals and drying.

2. The process for the recovery of pentaerythritols from aqueous mixtures comprising pentaerythritols and the syrupy products formed during the condensation of formaldehyde and acetaldehyde in aqueous alkaline medium which comprises removing the last portion of the water contained in these mixtures by distillation from mixtures with normal butyl alcohol, said normal butyl alcohol being used in at least sufficient quantity to dissolve the syrupy products and to form a filtrable mixture at the end of the distillation, cooling, filtering, washing the pentaerythritol crystals and drying.

3. The process for the recovery of pentaerythritols from aqueous mixtures comprising pentaerythritols and the syrupy products formed during the condensation of formaldehyde and acetaldehyde in aqueous alkaline medium which comprises removing the last portion of the water contained in these mixtures by distillation from mixtures with iso-butyl alcohol, said iso-butyl alcohol being used in at least sufficient quantity to dissolve the syrupy products and to form a filtrable mixture at the end of the distillation, cooling, filtering, washing the pentaerythritol crystals and drying.

4. The process for the recovery of pentaerythritols from aqueous mixtures comprising pentaerythritols and the syrupy products formed during the condensation of formaldehyde and acetaldehyde in aqueous alkaline medium, which comprises placing the mixture in a still, adding at least an equal amount of a liquid butyl alcohol to the contents of the still, heating the still to effect a distillation of the water from the mixture, continuing the addition of the liquid butyl alcohol and the distillation until the contents of the still is substantially anhydrous, cooling the contents of the still with stirring, filtering, washing the separated crystals and drying.

5. The process for the recovery of pentaerythritols from aqueous mixtures comprising pentaerythritols and the syrupy products formed during the condensation of formaldehyde and acetaldehyde in aqueous alkaline medium which comprises placing the mixture in a still, adding at least an equal amount of a normal butyl alcohol to the contents of the still, heating the still to effect a distillation of the water from the mixture, continuing the addition of the normal butyl alcohol and the distillation until the contents of the still is substantially anhydrous, cooling the contents of the still with stirring, filtering, washing the separated crystals and drying.

6. The process for the recovery of pentaerythritols from aqueous mixtures comprising pentaerythritols and the syrupy products formed during the condensation of formaldehyde and acetaldehyde in aqueous alkaline medium which comprises placing the mixture in a still provided with suitable condensing and separating equipment for the condensate, adding a liquid butyl alcohol to the contents of the still, heating the still to effect a distillation of the water from the mixture as an azeotropic mixture consisting of a normally liquid butyl alcohol and water, returning to the still the desired amount of the upper layer formed in the separator for the condensate, continuing the distillation until the contents of the still is substantially anhydrous, cooling the contents of the still with stirring, filtering, washing the separated crystals and drying.

7. In a process for the recovery of pentaerythritols from aqueous mixtures comprising pentaerythritols and the syrupy products formed during the condensation of formaldehyde and acetaldehyde in aqueous, alkaline medium, the step which consists of boiling said mixture in a liquid butyl alcohol until the whole mixture is substantially anhydrous.

JOSEPH A. WYLER.